May 15, 1928.
C. M. CHRISTENSEN
CLUTCH PEDAL CONTROL
Filed March 30, 1927
1,669,970
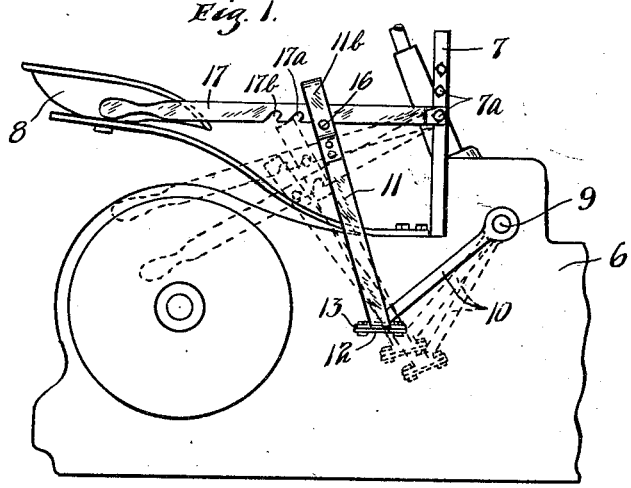
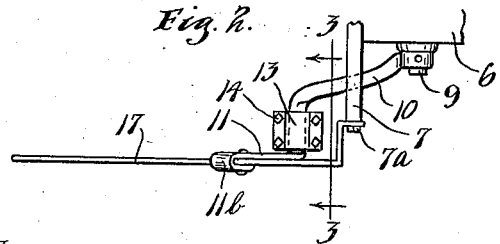
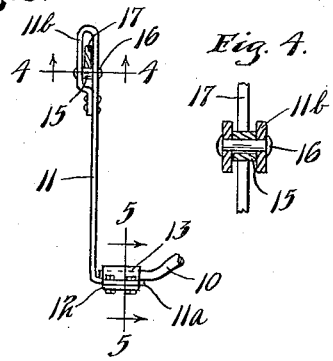
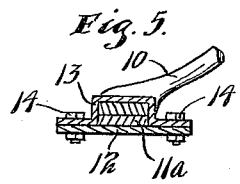
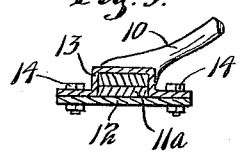
INVENTOR.
CHRIST M. CHRISTENSEN.
BY HIS ATTORNEYS.

Patented May 15, 1928.

1,669,970

UNITED STATES PATENT OFFICE.

CHRIST M. CHRISTENSEN, OF ALBERT LEA, MINNESOTA.

CLUTCH-PEDAL CONTROL.

Application filed March 30, 1927. Serial No. 179,499.

This invention relates to clutch pedal control devices for motor vehicles and particularly for tractors.

It is an object of this invention to provide a hand operated clutch pedal control which can be operated to swing the clutch pedal to throw the clutch out of engagement and which will hold the clutch pedal in such swung position.

It is a further object to provide in combination with the clutch pedal of a tractor of the Fordson type, a hand operated pedal control which may be operated either to swing the clutch pedal to throw the clutch out of engagement and to retain the pedal in such position or may be operated to swing the clutch pedal to throw the clutch out of engagement and to set the brakes of the tractor and to retain the clutch pedal in such position.

These and other objects and advantages of the invention will more fully appear from the following description made in connection with the accompanying drawings, wherein like reference characters refer to the same or similar parts throughout the various views and, in which, Fig. 1 is a view in right side elevation of the device applied to a tractor of the Fordson type, certain of the movable parts being shown shown in full lines in one position and in dotted lines in two other positions;

Fig. 2 is a plan view of certain of the parts illustrated in Fig. 1;

Fig. 3 is a vertical section taken on the line 3—3 of Fig. 2, as indicated by the arrows;

Fig. 4 is a horizontal section taken on the line 4—4 of Fig. 3, as indicated by the arrows, and, Fig. 5 is a vertical section taken on the line 5—5 of Fig. 3, as indicated by the arrows.

Referring to the drawings, certain portions of a tractor of the common Fordson type are illustrated, including the housing 6, dash 7, spring driver's seat 8, clutch pedal shaft 9 and clutch pedal 10. The said parts are of common construction and are well known in the art. The clutch pedal 10 will normally be held upwardly as by spring tension so that the normal position of the clutch pedal 10, when the clutch is in engagement, will be that illustrated in full lines in Fig. 1. To throw the clutch out of engagement, the pedal 10 must be depressed by swinging the same downwardly and forwardly to the position illustrated in the upper set of dotted lines, Fig. 1. To throw the clutch out of engagement and to set the brakes of the tractor, the clutch pedal 10 must be depressed to the position illustrated in the lower dotted lines Fig. 1.

In accordance with the present invention, a bar 11 formed from strap iron is provided having at its lower end a short diagonally bent and laterally offset portion $11^a$ adapted normally to extend in a horizontal plane, while the main portion of the bar will stand in plane inclined rearwardly from the vertical. The lower offset portion $11^a$ of bar 11 fits beneath the foot receiving portion of pedal 10 and is rigidly secured thereto by a clamp comprising a lower straight strap 12 extending beneath the offset portion $11^a$ and an upper U-shaped strap 13 extending over the foot receiving portion of pedal 10, the said straps being secured together by bolts 14. The main portion of bar 11 extends upwardly and rearwardly from pedal 10 and offset portion $11^a$ and is looped at its upper end to form a keeper $11^b$. A small roller 15 is carried in the keeper $11^b$ adjacent the lower side thereof by a stud 16 extending through the walls of the keeper. The dash 7 of the tractor is provided with bolts $7^a$ and pivoted to said dash by one of said bolts, preferably the lowest bolt, a hand lever 17 is provided. The lever 17, rearwardly from its pivoted end, is first bent outwardly and then rearwardly and the lever extends through the keeper $11^b$, the lower edge of the lever resting upon the roller 15 and the roller being adapted to ride on the lower edge of the lever. Two or more spaced rearwardly inclined notches $17^a$ and $17^b$ respectively, are formed in the lower edge of lever 17, while a handle portion is provided at the rear end of the lever.

Lever 17 when clutch pedal 10 is in raised position, as indicated in full lines Fig. 1, extends substantially horizontally and the handle portion of the lever lies closely adjacent the spring driver's seat 8, so that the same can be readily operated by the driver of the tractor. When it is desired to throw the clutch of the tractor out of engagement, lever 17 is merely grasped and swung downwardly thereby causing bar 11 to move downwardly to swing the foot pedal 10 downwardly and forwardly to throw the clutch out of engagement. As the lever 17 is swung downwardly, the roller 15 will ride rearwardly on the lower edge of the lever 17. The notch 17ᵃ is so cut in the lever 17 that when the foot pedal 10 has been depressed to such a point that the clutch is thrown out of engagement, the roller 15 will be caught in the notch 17ᵃ, so that when the operator releases the lever 17, the engagement between the roller 15 and the notch 17ᵃ will prevent bar 11 from becoming disengaged from lever 17, thereby securely holding the clutch out of engagement. The parts of the device will assume the position indicated in the upper dotted lines Fig. 1, when the foot pedal 10 has been swung downwardly as above described.

When now it is desired to throw the clutch out of engagement and to also set the brakes of the Fordson tractor, the lever 17 is pressed downwardly to the position indicated in the lower dotted lines Fig. 1, whereupon the roller 15 will slide rearwardly and will engage with the second notch 17ᵇ on the lever. The various parts will assume the position illustrated in the lower dotted lines Fig. 1, whereupon the clutch will be thrown out of engagement and the brakes will be set.

When it is desired to release the foot pedal to throw the clutch into engagement after the foot pedal has been secured in either the upper or lower position indicated in dotted lines Fig. 1, the foot portion of the pedal is merely pressed downwardly slightly by the foot of the operator, whereupon the lever 17 is raised slightly to disengage the roller 15 from a notch 17ᵃ or 17ᵇ, whereupon the operator by releasing his foot from the foot pedal and by holding the lever 17 up against the top of the keeper 11ᵇ will permit the foot pedal 10 to assume its normal upward position to throw the clutch into engagement.

The device is of high utility in use on tractors where it is often necessary for the operator to get off the tractor and adjust farm implements, or other machinery carried by the tractor. By use of the present device, the operator can throw the clutch of the tractor out of engagement without necessitating shifting gears while he gets off the tractor and does certain work on the ground. He can then readily and quickly throw the tractor again into gear upon returning to his seat. The device is of high utility where the tractor is being used in a stationary position to drive machinery. The clutch can be readily thrown out of engagement to stop the driven machinery without the necessity of the operator climbing onto the tractor and sitting in the driver's seat before the clutch can be thrown out of engagement.

The device has been successfully demonstrated in actual practice. The parts of the device are few and the construction is simple.

The inventor does not wish to limit himself to the use of the present invention in connection with the clutch pedal of Fordson tractors, or, in fact, any kind of tractors. The invention can be used in connection with any type of swingable control pedal.

It will, of course, be understood that various changes may be made in the form, details, arrangement and proportions of the various parts without departing from the scope of the present invention, which, generally stated, consists in the matter shown and described and set forth in the appended claims.

What is claimed is:

1. The combination with a clutch pedal which is adapted to be swung downwardly and forwardly to throw a clutch out of engagement, of a member rigidly connected to said clutch pedal and extending upwardly therefrom, a second member suitably pivoted adjacent one end and adapted to be supported on said first mentioned member at some little distance from its pivoted end, whereby as said second mentioned member is swung downwardly about its pivot said first mentioned member will be moved downwardly to swing said clutch pedal downwardly and forwardly.

2. The structure defined in claim 1, and means for holding said two members in engagement after said second mentioned member has been so swung to retain said clutch pedal in a downwardly and forwardly swung position.

3. The combination with the clutch pedal of a motor vehicle, of two members, one of which is rigidly secured to said pedal and extends upwardly therefrom, and the other of which is pivoted at one end and is adapted to rest on said first member and is adapted when so resting to form an acute angle with said first member in such manner that when said second member is swung downwardly said first member will be swung downwardly to depress said clutch pedal and said first member will slide on said second member.

4. The structure defined in claim 3, and means automatically engaging said first member with said second member when said first member has been slid on said second member a predetermined distance.

5. The combination with a motor vehicle clutch pedal, of means for controlling said clutch pedal, comprising a bar rigidly secured to said pedal, projecting upwardly therefrom and being formed as a keeper adjacent its upper end, and a lever suitably pivoted for swinging movement adjacent one end thereof, extending through the keeper portion of said bar, adapted to rest on the lower side of said keeper portion and to form an acute angle with said bar, the sides of the said angle being formed by the lower edge of said lever and the edge of said bar nearest the pivot point of said lever, whereby as said lever is pressed downwardly said clutch pedal will be swung downwardly and said bar will ride on said lever farther away from the pivot point of said lever.

6. The structure defined in claim 5, said lever having one or more notches thereon with which said bar is adapted to be engaged when said lever has been pressed downwardly, to retain the clutch pedal in downward position.

7. The combination with a clutch pedal of a motor vehicle which is adapted to be swung downwardly and forwardly to throw the clutch of the vehicle out of engagement, of a bar rigidly connected to said clutch pedal and projecting upwardly and rearwardly therefrom, said bar having a keeper portion formed therein adjacent its upper end, and a lever suitable pivoted forwardly of the keeper portion of said bar and extending through the keeper portion of said bar, said bar being adapted to ride rearwardly on said lever as the same is depressed, thereby swinging said clutch pedal downwardly and forwardly to throw the same out of engagement.

8. The structure defined in claim 7, and means for holding the clutch pedal in downwardly and forwardly pressed position.

9. The combination with a clutch pedal of a motor vehicle, which is adapted to be swung downwardly and forwardly to throw the clutch out of engagement, of a bar rigidly secured to said clutch pedal, extending upwardly and rearwardly therefrom and having a keeper formed adjacent its upper end, a roller within the lower portion of said keeper, and a lever pivotally secured forwardly of said keeper and extending therethrough, said roller being adapted to ride upon the lower edge of said lever, whereby as said lever is swung downwardly said bar will force said clutch pedal downwardly and forwardly to throw the clutch out of engagement, said bar riding rearwardly, said lever having a notch therein with which said roller is adapted to engage when said bar has reached a given rearward position.

10. The combination with a clutch pedal of a motor vehicle, which is adapted to be swung downwardly and forwardly to throw the clutch of the vehicle out of engagement, of a bar extending upwardly and rearwardly from said clutch pedal, a clamp rigidly securing said bar to said clutch pedal, said bar having a keeper portion formed therein at its upper end, a roller within said keeper portion, a lever pivoted forwardly of said keeper portion and extending through said keeper portion, said bar having a notch therein within which said roller is adapted to be engaged, whereby when said lever is swung downwardly said bar will be swung downwardly to swing the clutch pedal downwardly and forwardly to throw the clutch out of engagement and the upper end of said bar will be moved rearwardly in respect to said lever until said roller is engaged with said notch.

In testimony whereof I affix my signature.

CHRIST M. CHRISTENSEN.